April 17, 1928.                    1,666,582
A. F. RAYMOND
FASTENING BUTTON
Filed Aug. 26, 1926

Inventor:—
Achille Francois Raymond
By Munn, Cameron, Lewis & Kirkam
Attorneys

Patented Apr. 17, 1928.

1,666,582

UNITED STATES PATENT OFFICE.

ACHILLE FRANÇOIS RAYMOND, OF GRENOBLE, FRANCE.

FASTENING BUTTON.

Application filed August 26, 1926, Serial No. 131,776, and in France July 15, 1926.

My invention relates to a fastening button which is chiefly adapted for use upon automobile carriage bodies for securing curtains, canvas or leather covers and the like, and which comprises disappearing rollers or balls.

My said device offers the perpendicular feature consisting in the fact that it is buttoned by a simple pressure upon the female part or eyelet of the canvas cover or curtain, or like member, and cannot be disengaged by any effort of traction upon the latter, however great this effort may be.

The following description, with reference to the appended drawings which are given by way of example, discloses various embodiments of the invention.

Figure 1:
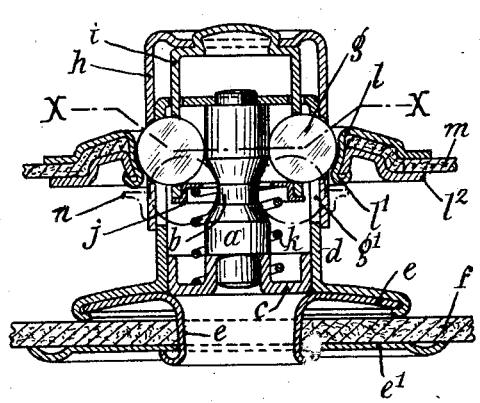
Fig. 1 is a section of a form of construction of the said button device.

As observed in Fig. 1, my said button device comprises a male part which is provided with a central axle $a$ having a restricted portion $b$; said axle is supported at the bottom by the disc $c$ which is mounted in the cylindrical envelope $d$, this being secured in any suitable manner to the canopy or canvas cover $f$, for instance by means of the eyelet $e$, a disc $e^1$ being disposed upon the other face of the canvas $f$.

At its upper part, the cylindrical envelope $d$ forms the second support for the axle $a$. Within the said envelope are mounted the rollers or balls $g$, which are for instance three in number and are slidable in the slots $g^1$ formed in the envelope $d$.

The rollers or balls $g$ are mounted in a cage having the form of a pressure button and consisting essentially of two concentric sleeves $h$ and $i$ which are secured together. The external sleeve $h$ is slidable upon the envelope $d$ and is provided with apertures through which each of the said rollers or balls may partially extend. The internal sleeve $i$ extends within the envelope $d$ and is provided with apertures through which the said rollers or balls may extend. The bottom of the sleeve $i$ is closed by the disc $j$; a spring $k$ abuts at one end against the disc $c$ and at the other end against the disc $j$, and it urges upwardly the said pressure button (i. e. the cage $h$—$i$) which draws with it the rollers or balls $g$.

The female part of the button device consists of an eyelet $l$ which is suitably secured, for instance by means of the disc $l^2$, to the canvas member (or the like) $m$ which is to be fastened to the member $f$.

The operation of my said button device is as follows:

When the eyelet $l$ is engaged upon the male part of the button, the lower edge $l^1$ of the said eyelet, whose diameter is less than the diameter of the circle passing through the extreme outer points of the rollers or balls $g$, draws with it the said rollers, which thus descend along the axle $a$ and attain the position which is shown in the dot and dash lines in Fig. 1. In this position, the said rollers may engage the restricted part $b$ of the axle $a$, so that they will disappear within the cage $h$. The eyelet may then descend beyond the said rollers, and as soon as this occurs, the cage $h$—$i$ together with the rollers will be raised by the spring $k$, and the axle will again pass between the said rollers or balls, thus spreading them out into the position shown in Fig. 1, and thereby preventing the said eyelet from leaving the male portion, so that the parts of the button device will be properly secured together. It will be observed that in this position, it will be impossible to remove the female from the male part by drawing upon the canvas $m$. To detach the female part, I press with the thumb upon the cage $h$—$i$, and at the same time use the other fingers of the hand to draw upon the canvas $m$. By pushing with the thumb upon part $h$—$i$, I lower the said rollers or balls $g$, and these will assume the position shown in the dot and dash lines in Fig. 1, thus disappearing and allowing the eyelet $l$ to be detached.

To obviate any play between the male and female parts in the assembled position shown in Fig. 1, I may dispose upon the external sleeve $h$ a flanged ring $n$ which is shown in the dot and dash lines in Fig. 1, and the lower edge $l^1$ of the eyelet $l$ will be held between the rollers or balls and the ring $n$.

Figure 3:
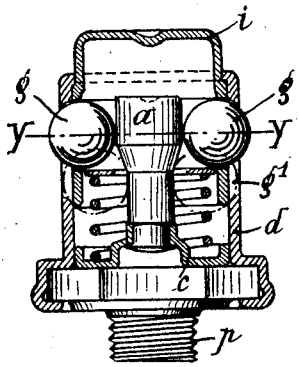
Fig. 3 is a vertical section of a modification.
Figure 2:
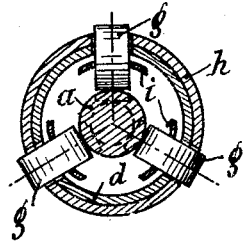
Fig. 2 is a section on the line X—X of Fig. 1.
Figure 4:
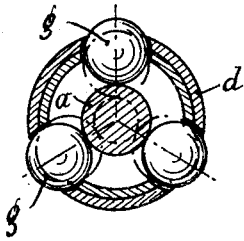
Fig. 4 is a section on the line Y—Y of Fig. 3.

In Fig. 3, which shows a modified construction employing suitable balls, the male parts of the button, instead of being secured by the eyelet $e$ is secured by a screw shank $p$. This device is particularly adapted for use in the case in which the male part is to be mounted upon a panel of wood or other material, into which the shank $p$ can be screwed. It is to be noted that the axle $a$ is held only at its lower part, and is riveted to the disc $c$. The push-piece or cage containing the balls $g$ comprises but a single sleeve $i$, which is slidable in the cylindrical outer envelope $d$.

Figure 5:
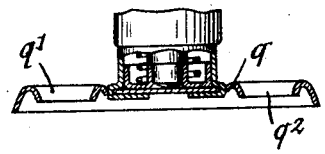
Fig. 5 is a partial section of another modification.
Figure 8:
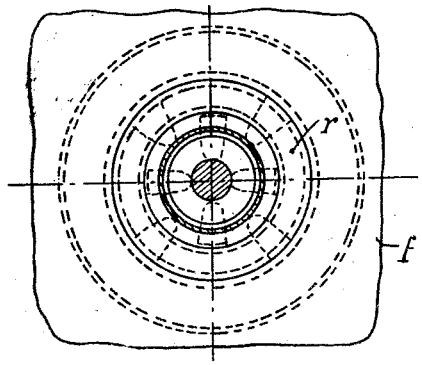
Fig. 8 is the corresponding plan view.
Figure 6:
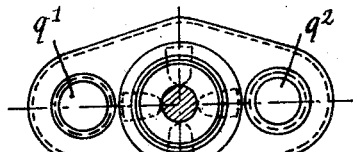
Fig. 6 is the corresponding plan view.

In the modification shown in Fig. 5, the male part is mounted on an oval base $q$ which is apertured at $q^1$ $q^2$ for the insertion of wood screws.

Figure 7:
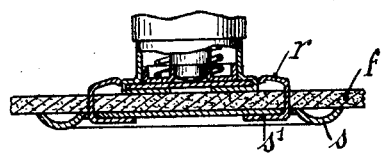
Fig. 7 is a partial section of another form of construction.

In the modified construction shown in Fig. 7, the male part is secured to a claw base $r$ whose claws $s^1$ are inserted through the canvas or like member $f$ and through slots formed in the oppositely-disposed disc $s$, the said claws being bent down as shown in Fig. 7.

My said button device is applicable for the fastening of all curtains, canopies or like members employed for closing purposes, whether of canvas, leather, wood, metal or the like, upon corresponding parts consisting of canvas, leather, wood, metal or other material. The eyelet $b$ or female part, with its facing plate, are not absolutely essential, provided the part upon which the device is applied is of sufficient strength, this consisting for instance of wood, metal, celluloid or the like.

Obviously, the said device is susceptible of all suitable modifications in detail, without departing from the spirit of the invention.

What I claim is:—

1. A button device comprising a male part consisting of a slotted casing, an axle disposed in the interior of the said male part, a portion of the said axle having a reduced diameter, fastening elements extending through the slots in the said casing and slidable along the said axle, a cylindrical sleeve adapted to slide in the said casing and to draw with it the said fastening elements which will disappear when they coincide with the restricted part of the said axle, a spring upwardly urging the said cylindrical sleeve and adapted to maintain the said fastening elements in the fastening position, an eyelet coacting with the casing of the male part.

2. A button device comprising a male part consisting of a slotted casing, a stationary axle secured in the interior of the said casing, said axle having a restricted portion, fastening elements extending through the slots in the said casing and slidable along the axle, means for displacing said fastening elements in the slots of the casing and along the axle whereby the said elements disappear when they coincide with the restricted part of the axle, elastic means for returning to normal position the means serving to displace the fastening elements, and an eyelet coacting with the male part.

In testimony whereof I have signed this specification.

ACHILLE FRANÇOIS RAYMOND.